United States Patent
Bergandy et al.

(10) Patent No.: US 12,409,954 B1
(45) Date of Patent: Sep. 9, 2025

(54) SELF-ADJUSTING GAP SYSTEM FOR SPACE CHARGING MITIGATION AND MONITORING

(71) Applicant: United States of America as represented by the Administrator of NASA, Washington, DC (US)

(72) Inventors: Konrad Bergandy, Greenbelt, MD (US); Claef Hakun, Greenbelt, MD (US); Martin Matson, Greenbelt, MD (US); Elliott Martin, Greenbelt, MD (US); Robert Meloy, Lanham, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 443 days.

(21) Appl. No.: 17/955,669

(22) Filed: Sep. 29, 2022

(51) Int. Cl.
*B64G 1/54* (2006.01)
*H01T 1/00* (2006.01)

(52) U.S. Cl.
CPC ...... *B64G 1/54* (2013.01); *H01T 1/00* (2013.01)

(58) Field of Classification Search
CPC .. B64D 45/02; H05F 3/04; B64G 1/54; H02H 9/06
See application file for complete search history.

(56) References Cited

U.S. PATENT DOCUMENTS

| | | | | |
|---|---|---|---|---|
| 3,408,525 | A * | 10/1968 | Bahr | H01J 17/00 218/123 |
| RE26,694 | E * | 10/1969 | Hansen et al. | H01T 4/08 313/325 |
| 2023/0208257 | A1 * | 6/2023 | Hoerr | H01R 39/20 310/71 |

* cited by examiner

*Primary Examiner* — Rexford N Barnie
*Assistant Examiner* — Christopher J Clark
(74) *Attorney, Agent, or Firm* — Derek J. Langdon; Matthew F. Johnston; Trenton J. Roche

(57) ABSTRACT

A self-adjusting gap system, including: a flexure connected to a first electrically isolated element, wherein the flexure allows motion or has a flexible element, and has an electrically conductive element; a contact fixture connected to a second electrically isolated element, wherein the second electrically isolated element is electrically isolated from the first electrically isolated element; and a contact point on one of the contact fixture and the flexure configured to be a discharge location for a discharge of a differential charge between the first electrically isolated element and the second electrically isolated element; wherein the flexure is configured to flex or move due to the differential charge to reduce an initial first gap between the flexure and the contact fixture.

17 Claims, 10 Drawing Sheets

SELF-ADJUSTING GAP SYSTEM FOR SPACE CHARGING MITIGATION AND MONITORING

ORIGIN OF THE INVENTION

The invention described herein was made by employees of the United States Government, and may be manufactured and used by or for the Government for Government purposes without the payment of any royalties thereon or therefore.

TECHNICAL FIELD

Various exemplary embodiments disclosed herein relate a self-adjusting gap system for space charging mitigation and monitoring.

BACKGROUND

Spacecraft travelling in orbit may accumulate charges on different electrically isolated systems. This may be due to radiation impinging upon the spacecraft or because of Auroral charging events. Sudden discharge of built up charge can damage various systems on the spacecraft.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a self-adjusting gap system, including: a flexure connected to a first electrically isolated element, wherein the flexure allows motion or has a flexible element, and has an electrically conductive element; a contact fixture connected to a second electrically isolated element, wherein the second electrically isolated element is electrically isolated from the first electrically isolated element; and a contact point on one of the contact fixture and the flexure configured to be a discharge location for a discharge of a differential charge between the first electrically isolated element and the second electrically isolated element; wherein the flexure is configured to flex or move due to the differential charge to reduce an initial first gap between the flexure and the contact fixture.

Various embodiments are described, further comprising a bleed circuit electrically connected between the flexure and the first electrically isolated element, wherein the bleed circuit includes an electrical element configured to control a discharge current between the flexure and the contact point.

Various embodiments are described, further comprising a mounting bracket, wherein a first end of the flexure is connected to the mounting bracket.

Various embodiments are described, further comprising a shim, wherein the shim is between the mounting bracket and the flexure and the shim is configured to control the first initial gap.

Various embodiments are described, further comprising a bridge, wherein the mounting bracket is connected to the bridge.

Various embodiments are described, further comprising a hard stop connected to the bridge, wherein an end of the hard stop forms a second gap with the flexure and the end of the hard stop limits a distance that the flexure can move towards the hard stop.

Various embodiments are described, further comprising an electrically isolating member mechanically between the bridge and the first electrically isolated element.

Various embodiments are described, where the second electrically isolated element rotates relative to the first electrically isolated element.

Various embodiments are described, further comprising a bridge, wherein the flexure is connected to the bridge.

Various embodiments are described, further comprising a shim, wherein the shim is between the bridge and the flexure and the shim is configured to control the first initial gap.

Various embodiments are described, further comprising a hard stop connected to the bridge, wherein an end of the hard stop forms a second gap with the flexure and the end of the hard stop limits a distance that the flexure can move towards the hard stop.

Various embodiments are described, further comprising an isolating member mechanically between the bridge and the first electrically isolated element.

Various embodiments are described, where the flexure includes a flexure body and a plurality of flexure springs connected to the flexure body, wherein the flexure springs connect to the bridge.

Various embodiments are described, wherein the flexure springs have a U-shaped structure.

Various embodiments are described, wherein the flexure springs have a zig-zag shaped structure.

Various embodiments are described, wherein the flexure body is round and the flexure springs have curved shape.

Various embodiments are described, further comprising a sensor configured to measure a strain on the flexure, deflection of flexure, shape of flexure, or gap size between the flexure and contact fixture to determine a voltage between the flexure and the contact fixture.

BRIEF DESCRIPTION OF THE DRAWINGS

In order to better understand various exemplary embodiments, reference is made to the accompanying drawings in the following listing.

To facilitate understanding, identical reference numerals have been used to designate elements having substantially the same or similar structure and/or substantially the same or similar function.

DETAILED DESCRIPTION

Figure 1A:
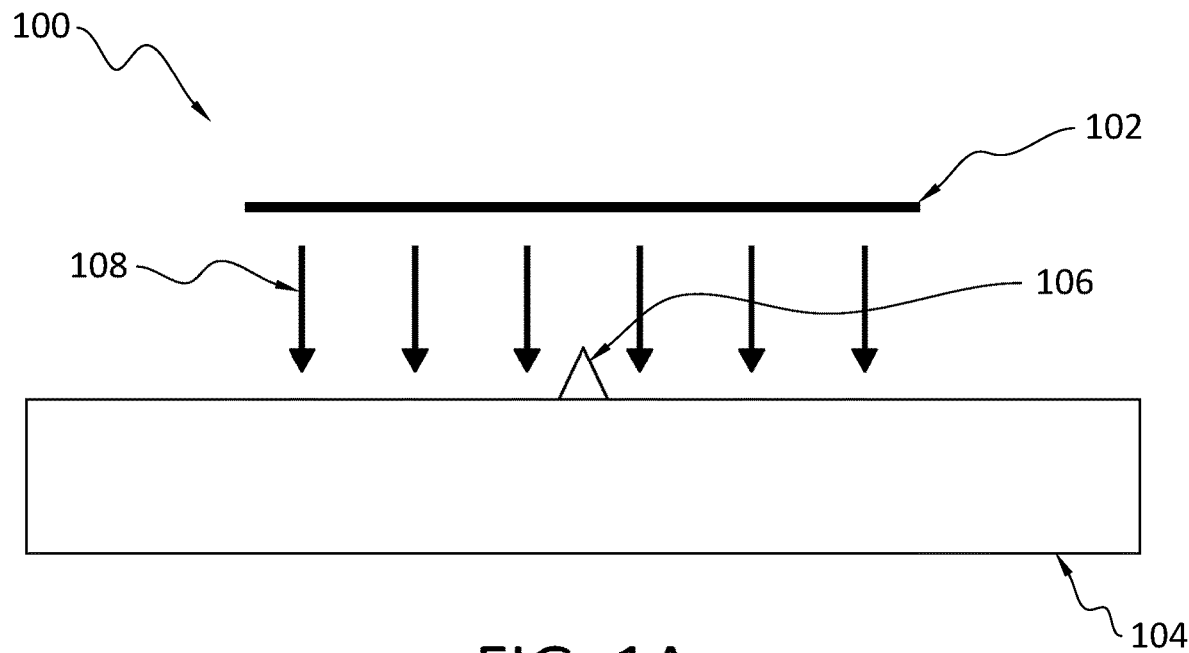
FIG. 1A illustrates a basic structure of the self-adjusting gap system.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

As a spacecraft orbits the earth, various portions, especially exposed portions, of the spacecraft may became charged due to the effects of high energy electrons in the Van Allen Belts, South Atlantic Anomaly, and Auroral zones. Various parts of the spacecraft may be electrically isolated from one another. For example, a spinning device may use non-conducted bearings, for example silicon nitride ball bearings, that electrically isolate the spinning device from nearby structures. When the charge differential between the spinning device and some nearby structure becomes large enough, an uncontrolled discharge may occur. Such discharges may include large voltages and currents that may damage various electronic systems on the spacecraft. Further, such a large discharge can lead to mechanical damage that affects mechanical systems. For example, if the discharge occurs across a bearing surface of the spinning device a pit may be formed on the bearing surface. This pit can then lead to degradation of the bearing and eventual failure of the bearing.

In one example of a spacecraft having a polar orbit, the spacecraft may include an exposed drum of a spinning telescope, an internal spinning actuator, and non-conductive ball bearings that leads to voltage potential that could result in a large uncontrolled discharge, which could damage the electronics and bearings of the spacecraft. Such a charge build up could lead to voltages above 1000 V between isolated portions of the spacecraft.

Various solutions to this problem may include the use of slip bearings, a continuous contact system, or a controlled gap. The use of slip bearing can create torque or other mechanical disturbances, and many rotating systems on the spacecraft are very sensitive to torque or other mechanical disturbances. The continuous contact system also may create torque or other mechanical disturbances and contamination, but also have longevity and reliability issues. A controlled gap solution may include electrodes separated by a predetermined gap, and when the charge becomes large enough, it discharges across the gap. This approach requires a small gap and is very difficult to control the voltage at which a discharge will occur. Further, discharges may result in electrode erosion or deposition that can change the discharge voltage. None of these solutions provides a satisfactory solution to the problem. Accordingly, there remains a need for a discharge system that can discharge isolated systems, including rotating or other moving systems, in a way that will protect various electrical and mechanical systems without creating a torque or other mechanical disturbance. Also the discharge system needs to work in a space environment and be able to survive the launch into space. While the self-adjusting gap system described herein is described in the context of a space system, it may be used on other types of systems as well where electrical discharge may be a problem.

Embodiments of a self-adjusting gap system will now be described. The self-adjusting gap system is a non-contacting device that may discharge an electrically isolated bodies (such as an isolated rotating shaft) to reduce the voltage differential between them and/or measure the voltage differential between them. This provides a self-powered, on-demand method of discharging potential developed due to internal or surface charging of spacecraft components that are electrically isolated and sensitive to torque or other mechanical disturbances or contamination. This self-adjusting gap system includes a flexure, a discharge point and a bleed circuit that controls the voltage, location, and current of a discharge event. It also limits torque or other mechanical disturbances, minimizes contamination from debris generation, reduces the risk to sensitive components, does not consume spacecraft power, and has a long functional lifetime. It has the ability to automatically decrease the mechanical gap between the flexure and the discharge point until there is a discharge when a voltage potential develops. This approach allows for a larger starting gap, temporary activation, and better control of the discharge voltage scenario. In turn, this makes the self-adjusting gap system able to tolerate launch loads, reduce the severity of electrical discharge, and work more reliably when a potential develops in vacuum or ground testing. It may be deployed in various types of missions such as earth orbit, planetary orbit, or deep space missions. As described above this concept uses basic physics and uniquely applies those physics in combination with carefully designed and tested components to provide a space-based solution with a number of advantages over the existing technology.

Figure 1B:
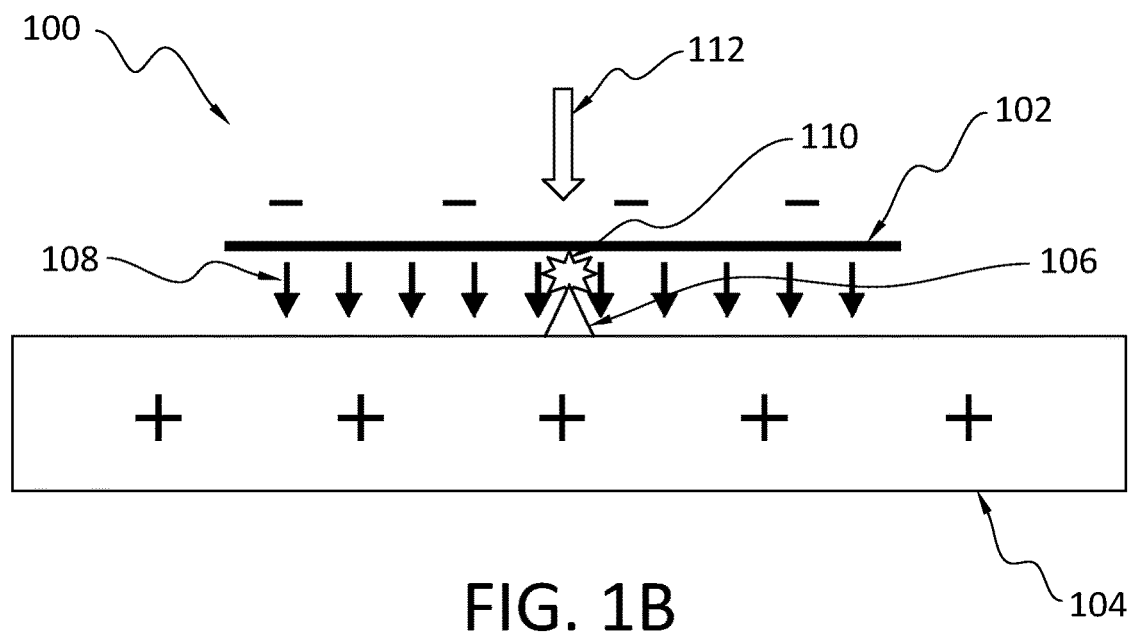
FIG. 1B illustrates a discharge of the self-adjusting gap system.

FIG. 1A illustrates a basic structure of the self-adjusting gap system. FIG. 1B illustrates a discharge of the self-adjusting gap system. In order to provide protection from such conditions or to measure the potential between isolated bodies, the self-adjusting gap system 100 includes two groups of components mounted on their respective elements. The main components mounted on the first element include base charge plate 104 that generates a field when charged and a contact point 106 attached to the base charge plate 104 that determines the location of the discharge and provides the geometry that allows for a precise setting of the desired discharge voltage. The second element has a flexure 102 acting as a flexible element providing self gap adjustment and charge sensing capabilities. The charge sensing capability may be implemented by placing a strain gauge on the flexure 102 or other sensor that measures the deflection of the flexure, shape of the flexure, or gap size between the flexure and contact fixture. The measured strain, deflection, shape change, or gap size change along with the various physical parameters of the system can be used to determine the amount of charge on the flexure 102 and hence a voltage difference between the flexure 102 and the base charge plate 104. As illustrated in FIG. 1B, as a voltage potential develops, the flexure 102 automatically moves toward the discharge point 106, decreasing the gap, until a breakdown occurs leading to a discharge. Note that this may or may not result in actual physical contact between the flexure 102 and the base charge plate 104, but it allows for the physical distance to adjust itself as the potential develops. After discharge the flexure 102 returns to its nominal position such as shown in FIG. 1A. Then as charge differential builds between the flexure 102 and the base charge plate 104, the flexure 102 will again move again as indicated by the motion of flexure 112. This allows for excess charge to be repeatedly discharged in a more controlled fashion without endangering sensitive electronic components, without torque or other mechanical disturbances, and without creating contamination.

The ability of the flexure 102 to flex/move allows for a large starting gap, a precise setting of the discharge voltage, and the ability to measure this flexure deflection (with a simple strain gauge) to provide charge sensing capability even when the system does not discharge. This feature may also be used to capture charge data that then may be used to better understand the charge environment in various locations in space. The capability to adjust the geometry and material (e.g., thickness, size, shape etc.) of the flexure 102 and the base charge plate 104 combined with the ability to set the gap distance and shape of the contact point 106 provide excellent flexibility in tuning the system for any desired mission parameters (such as discharge voltage and vibration environment). It is noted that in other embodiments the contact point may be placed on the flexure 102 instead of on the base charge plate 104.

Figure 1C:
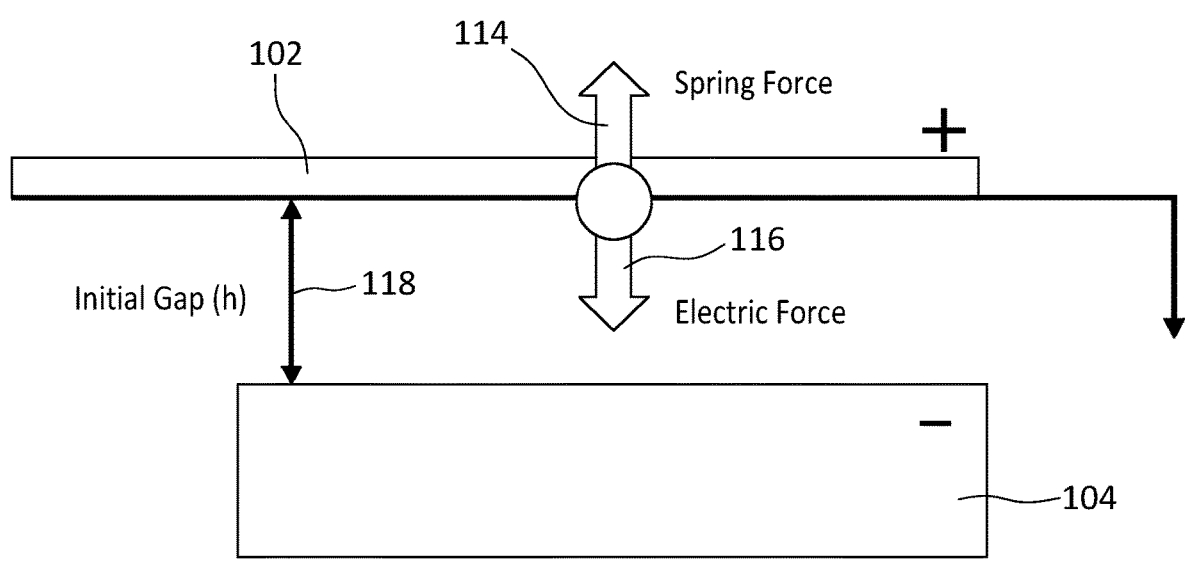
FIG. 1C illustrates various parameters used to describe the forces found in the self-adjusting gap system.

FIG. 1C illustrates various parameters used to describe the forces found in the self-adjusting gap system 100. The structure of the flexure 102 leads to a spring force 114 that causes the flexure 102 to return to a substantially straight or flat structure. For example, when a charge difference builds up between the flexure 102 and the base charge plate 104, an electric force 116 will cause the flexure 102 to bend towards the base charge plate 104. When the built up charge difference is reduced or removed (e.g., via discharge), the spring force 114 will cause the flexure 102 to return to its natural shape and position. The flexure 102 and base charge plate 104 have an initial gap (h) 118. These forces will now be described mathematically.

There is an electric force 116 between parallel capacitive plates when differential voltage exists between them. The flexure 102 and base charge plate 104 act as capacitive plates when a charge difference occurs. As the voltage and charge difference increases, the electric force 116 gets stronger. When the flexure 102 acts as a parallel capacitor plate, the electric force 116 causes the flexure 102 to bend or move towards the base charge plate 104 to thereby reduce the gap between the flexure 102 and base charge plate 104. Then when there is no differential voltage or charge difference, the spring force 114 returns the flexure 102 to at rest position The spring force 114 maybe calculated as follows:

$$F_{spring} = kx,$$

where k is a spring constant and x is the displacement distance of the flexure 102.

The electric force 116 may be calculated as follows:

$$F_{electric} = \frac{A\varepsilon V^2}{2(h-x)^2},$$

where ε is permittivity, A is the area of capacitance, h is the starting gap size between the flexure and contact plate, x is the displacement, and V is the voltage between the flexure 102 and base charge plate 104.

The following discharge voltage control may be derived:

$$V = \sqrt{\frac{8kh^3}{27A\varepsilon}}.$$

The discharge equation includes three inputs: area of capacitance (A); flexure spring constant (k); and initial gap distance (h). The spring constant and area of capacitance can be changed by changing the flexure 102 geometry and material. The initial gap distance can be set by how the flexure 102 is mounted relative to the base charge plate 104. The various parameters of the self-adjusting gap system 100 may be selected to limit the discharge voltage. The discharge current may also be controlled and limited. This may be accomplished by placing a bleed resistor circuit between the self-adjusting gap system 100 and ground. The values of the resistors in the bleed resistor circuit may be selected to limit the current to a predetermined value based upon the discharge voltage limit.

The discharge voltage limit may be selected to be low enough to make the self-adjusting gap system 100 most likely location of discharge (i.e., rather than having arcing occur between other elements of the host system.) Further, the geometry of the self-adjusting gap system 100 may be controlled to guarantee a discharge point in the system. This may be further facilitated by the use of a contact point that will be described later.

The self-adjusting gap system 100 helps mission survivability because the system is only activated when a differential voltage exists and leads to minimal contact between the system elements having a voltage differential. Hence the initial gap and the flexure 102 geometry and material may be selected to allow for a controlled discharge of accumulated charge.

Figure 2A:
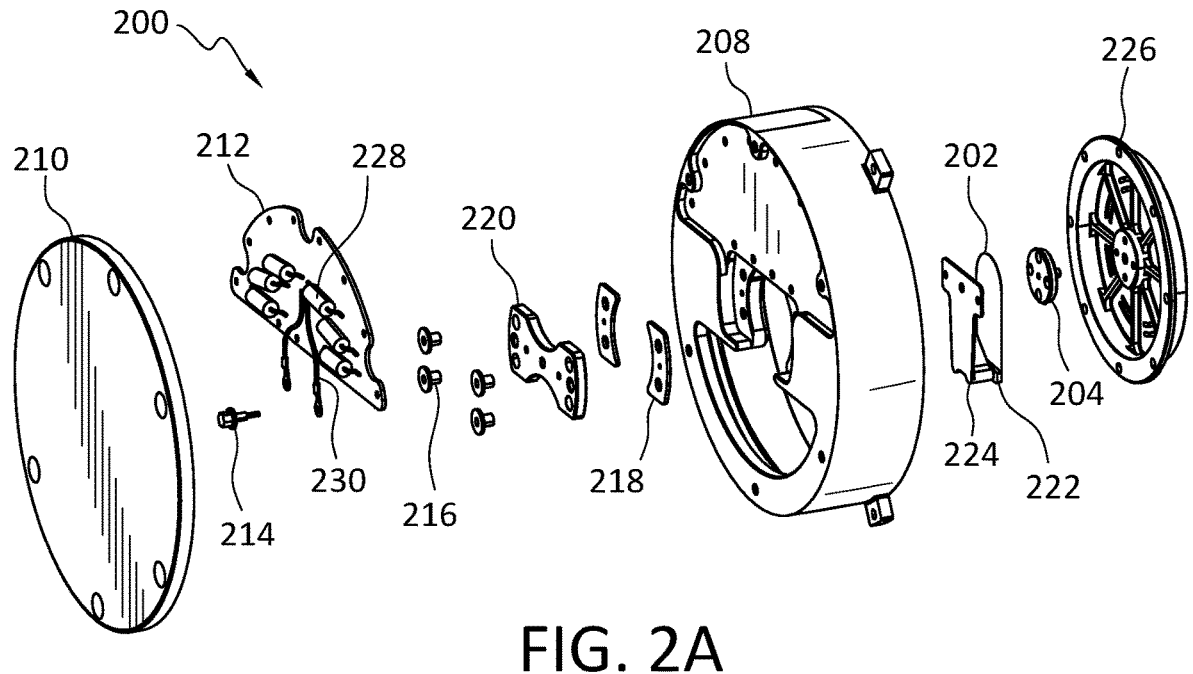
FIGS. 2A and 2B illustrate an exploded view and cross-sectional view of first embodiment of an application of the flexure to an isolated spinning shaft.
Figure 2B:
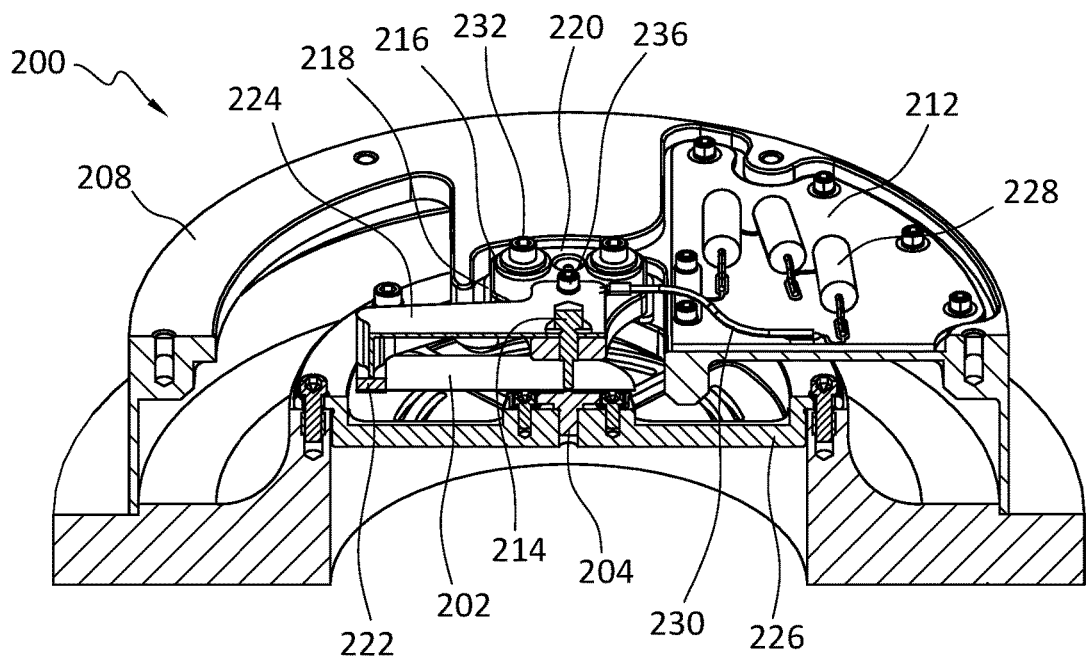

FIGS. 2A and 2B illustrate an exploded view and cross-sectional view of first embodiment of an application of the flexure to an isolated spinning shaft. The motor gap system 200 (which is a self-adjusting gap system) includes interface plate 226 that rotates along with the motor shaft (not shown). The motor gap system 200 includes motor cover 208 and closeout cover 210. The motor cover 208 houses the various elements that implement the variable gap discharge system including a contact fixture 204, flexure 202, bridge 220, bleed circuit board 212, and hard stop 214. The contact fixture 204 is attached to interface plate 226 and rotates with the motor shaft. The flexure 202 is mounted on the bridge 220 so that it forms a gap between the flexure 202 and the contact fixture 204. The resistor bleed circuit board 212 is electrically connected to the bridge 220 and hence the flexure 202 by the discharge wire 230.

Screw insulators 216 and bridge insulators 218 electrically isolate the bridge 220 and hence the flexure 202 from the motor cover 208. The screw insulator 216 is placed in mounting holes on the bridge 220 and then bridge bolt 232 are fed through the screw insulator 216 and is then threaded into the motor cover 208. The bridge insulators 218 are placed between the bridge 220 and the motor cover 208 to facilitate electrical isolation between the bridge insulator 218 and the motor cover 208 so the electrical discharge between the flexure 202 and the contact fixture 204 flows through the bleed circuit board 212 to the motor cover 208 in order to better control the discharge current.

The bleed circuit board 212 may include resistors 228 that help to reduce the current flow and control the time constant when the discharge occurs. This provides the ability to protect sensitive electronics from a sudden field collapse or ground plane disturbance. The number and parameters of the resistors 228 are selected based upon the potential voltage build up and the desired maximum current flow. Also because this may be a space based application, the resistors 228 will be manufactured to operate in a space environment and also there may be redundancy of the resistors 228 to compensate for a single point failure.

Figure 3A:
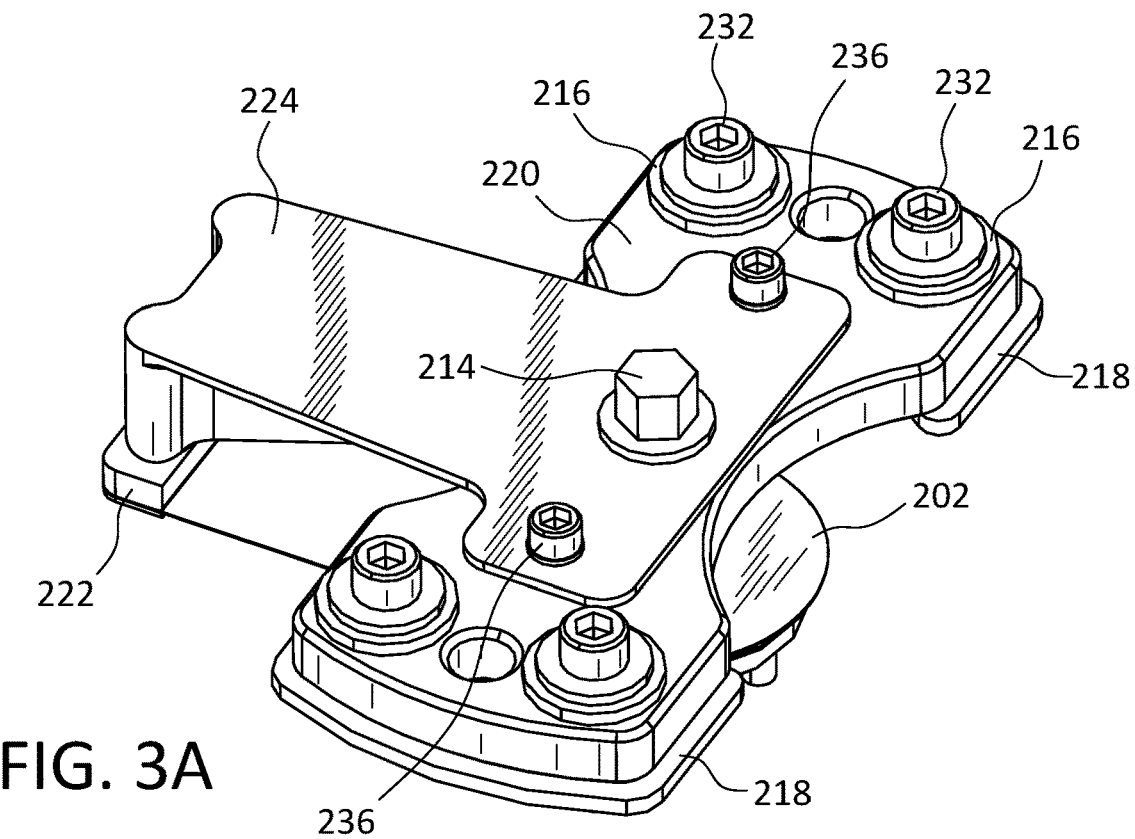
FIGS. 3A and 3B illustrate top perspective and bottom perspective views of the flexure and contact fixture.
Figure 3B:
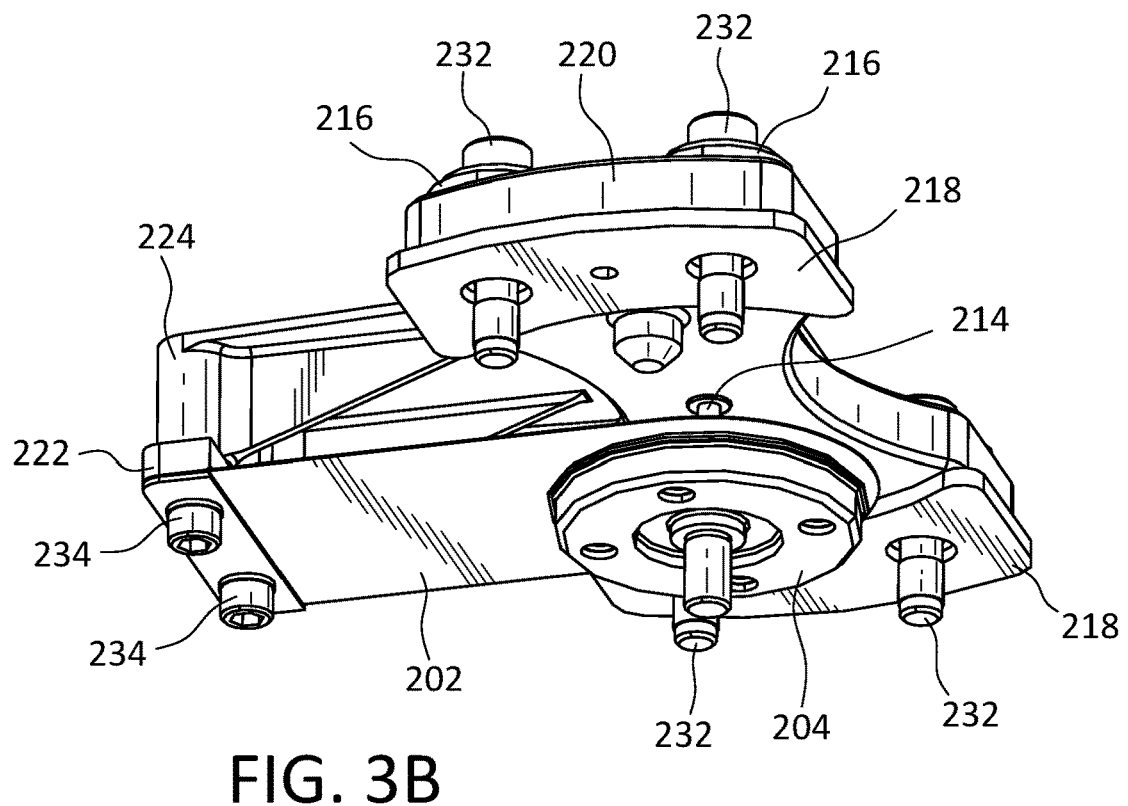
Figure 3C:
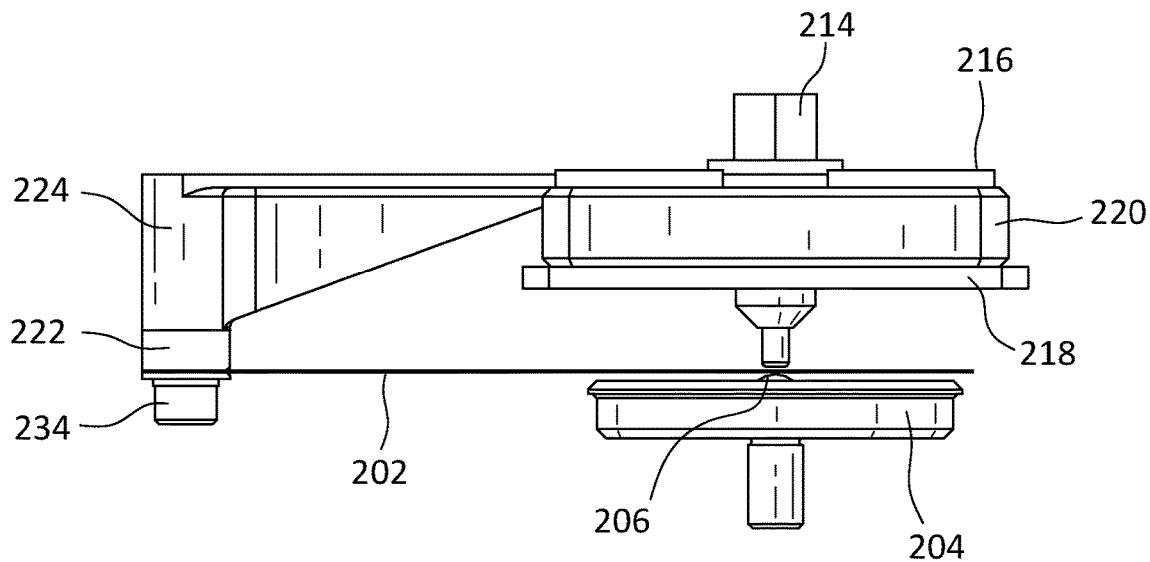
FIG. 3C illustrates a side view of the flexure and the contact fixture.
Figure 3D:
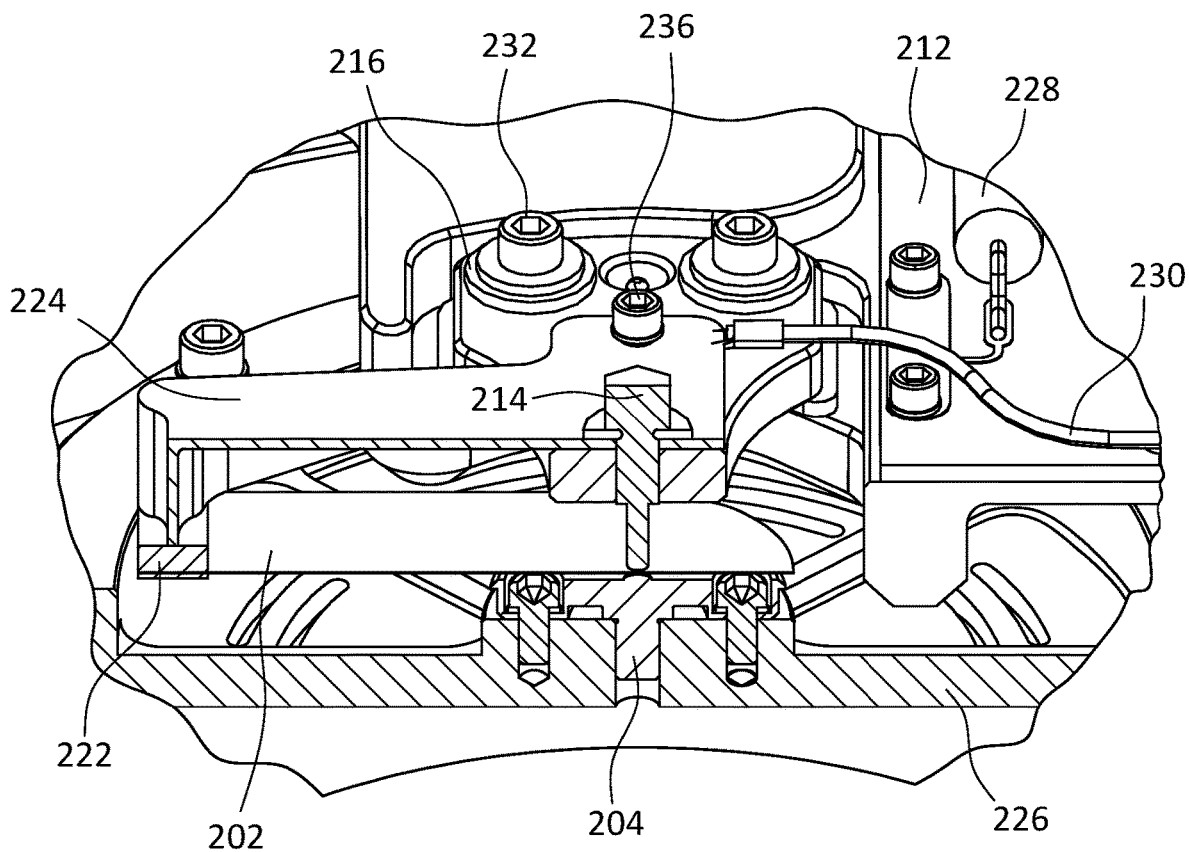
FIG. 3D illustrates a cross-sectional view of the flexure and the contact fixture.

FIGS. 3A and 3B illustrate top perspective and bottom perspective views of the flexure 202 and contact fixture 204. FIG. 3C illustrates a side view of the flexure 202 and the contact fixture 204. FIG. 3D illustrates a cross-sectional view of the flexure 202 and the contact fixture 204. The flexure 202 may have a diving board structure. The flexure 202 is a thin elongated conductive member that is substantially parallel to the contact fixture 204. It is attached to L-bracket 224 using a shim 222 and flexure bolt 234. The L-bracket 224 may then be attached to the bridge 220. As described above the bridge 220 is attached to the motor cover 208 using screw insulators 216 and bridge insulators 218. The shim 222 may be used to adjust the initial gap between the flexure 202 and the contact fixture 204. Shims 222 with different thicknesses will lead to different initial gaps and may be used to select a specific initial gap.

A hard stop 214 may be inserted through the bridge 220. The distal end of the hard stop 214 is adjacent the flexure 202 and limits the movement of the flexure 202 in the direction of the hard stop 214. This prevents the flexure 202 from being damaged or deformed by extreme movement of the flexure 202 towards the bridge 220 that may occur, for example, during launch of the spacecraft.

The contact fixture 204 includes contact point 206. The contact point 206 serves the same purpose of discharge point 106 from FIGS. 1A and 1B. The contact point 206 forms a gap with the flexure 202. This gap may be selected to achieve the desired discharge characteristic of the motor gap system 200. The contact point 206 also provides a specific discharge point on the contact fixture 204. In other embodiments the contact point may be on the flexure 202, or there may even be two contact points: one on the flexure 202 and one on the contact fixture 204.

As a charge differential builds up between the rotating part of the motor and the motor cover 208 due to the use of non-conducting motor bearing, the flexure 202 will move towards the contact point 206. Eventually, if the charge differential and voltage become great enough, the charge may discharge either across the reduced gap between the flexure 202 and the contact point 206 or when the flexure 202 comes into contact with the contact point 206.

Figure 4:
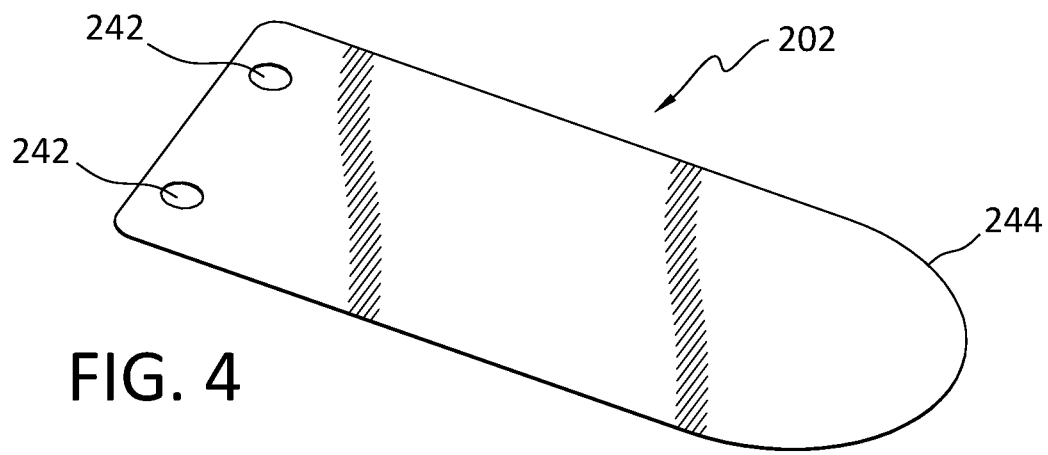
FIG. 4 illustrates a perspective view of the flexure.

FIG. 4 illustrates a perspective view of the flexure 202. The flexure 202 has an elongated thin structure. The thickness of the flexure 202 will affect the spring force 114 of the flexure 202 as it resists the electric force 116. Hence the thickness, width, and length of the flexure 202 will be selected to achieve a spring constant k that leads to a specific discharge voltage as described above. Further, the material of the flexure 202 will also effect the spring constant k and hence will be selected accordingly.

The flexure 202 may include flexure mounting holes 242. The flexure mounting holes 242 allow for the flexure 202 to be mounted to the L-bracket 224 using flexure bolts 234. The flexure 202 is illustrated as having a flexure distal end 244 that is semi-circular. This specific shape matches the circular shape of the contact fixture 204. The flexure distal end 244 may have other shapes as well that may or may not match its associated structure (e.g., the contact fixture 204 in this case attached to a motor).

Figure 5A:
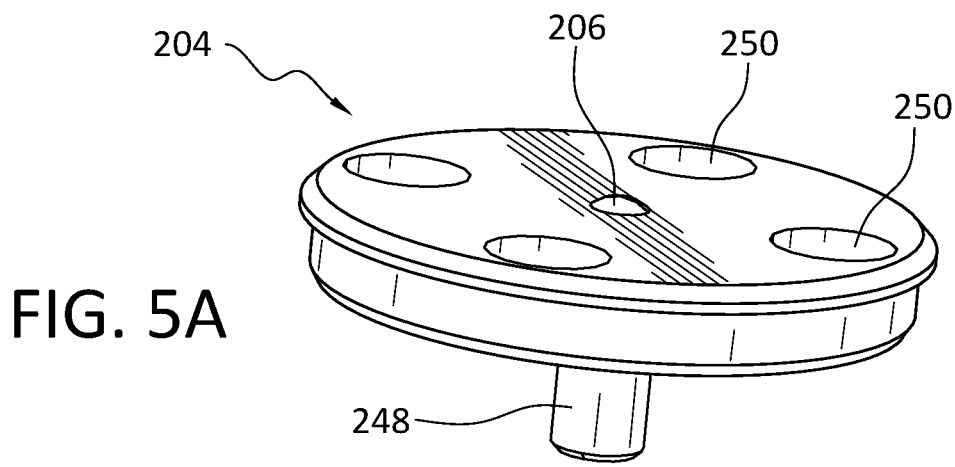
FIGS. 5A and 5B illustrated top perspective and bottom perspective views of the contact fixture.
Figure 5B:
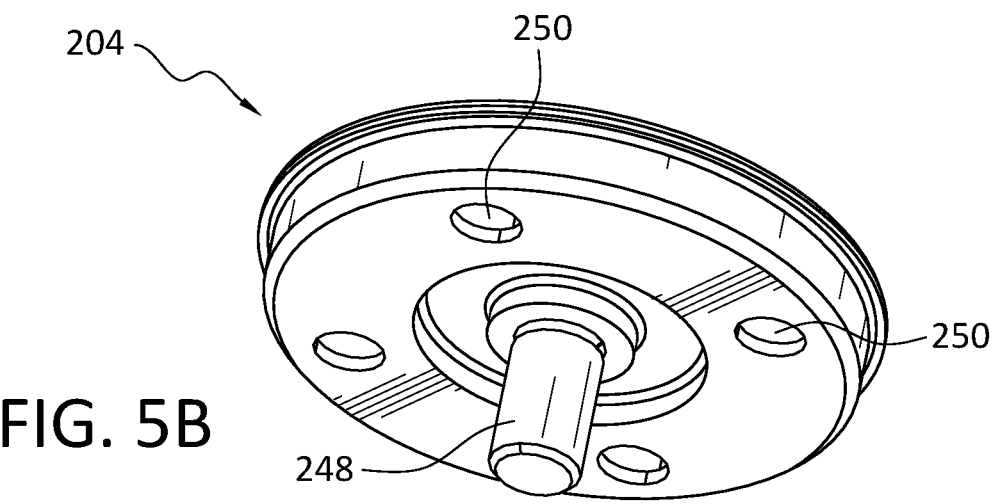

FIGS. 5A and 5B illustrated top perspective and bottom perspective views of the contact fixture 204. In this example, the contact fixture 204 is round with a spindle 248 because it is attached to a motor. The contact fixture 204 also includes contact fixture mounting holes 250 that facilitated it connection to the motor. The shape and structure of the contact fixture 204 may take any shape in order to form the gap system depending upon the specific application.

The contact fixture 204 includes a contact point 206. The contact point 206 is located in the center of a top surface of the contact fixture 204. The contact point 206 facilitates the discharge of accumulated charge and allows for the discharge to occur at a specific location. The height of the contact point 206 also comes into play regarding the discharge voltage. The contact point 206 is illustrates as being formed integral to the contact fixture 204. In other embodiments, the contact point 206 may be attached to the contact fixture 204 using various methods.

Figure 6A:
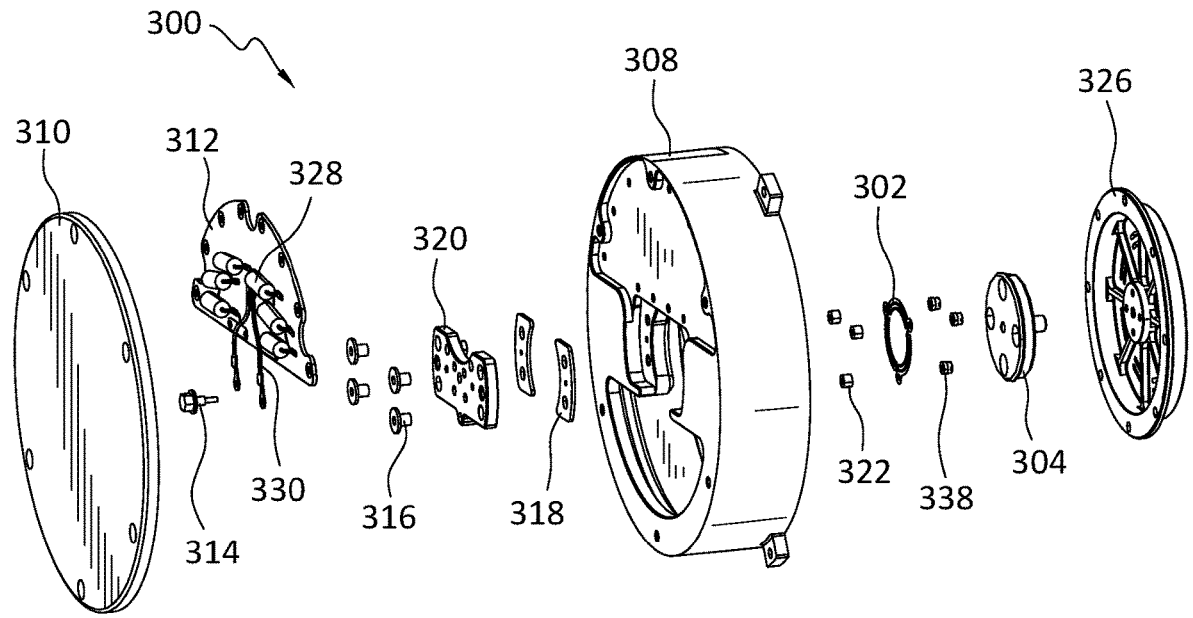
FIGS. 6A and 6B illustrate an exploded view and cross-sectional view of a second embodiment of an application of the flexure to a spinning shaft.
Figure 6B:
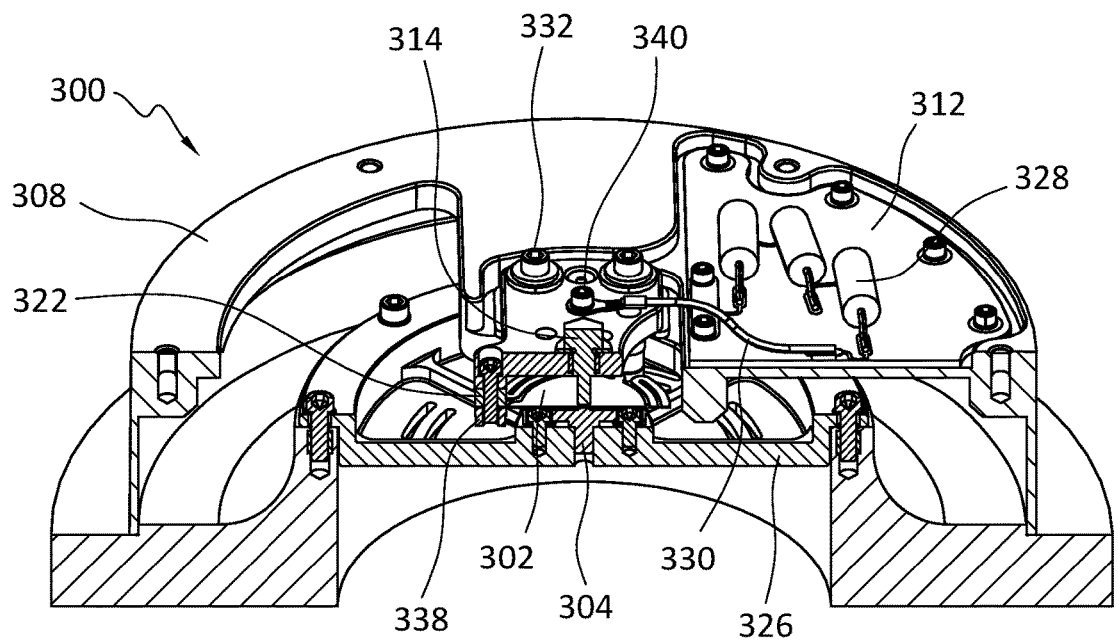

FIGS. 6A and 6B illustrate an exploded view and cross-sectional view of a second embodiment of an application of the flexure to a spinning shaft. The motor gap system 300 (which is a self-adjusting gap system) is very similar to the motor gap system 200 of FIG. 2. The main difference is the structure and shape of the flexure 302. Similar numbers are used for elements in the motor gap system 300 as used for the motor gap system 200 in FIG. 2. These elements in FIG. 3 function the same the related elements in FIG. 2 unless otherwise described. Hence, only a portion of the elements of FIG. 3 will be described.

The motor gap system 300 includes interface plate 326 that rotates along with the motor shaft (not shown). The motor gap system 300 includes motor cover 308 and close-out cover 310. The motor cover 308 houses the various elements that implement the variable gap discharge system including a contact fixture 304, flexure 302, bridge 320, bleed circuit board 312, and hard stop 314. The contact fixture 304 is attached to interface plate 326 and rotates with the motor shaft. The flexure 302 is mounted on the bridge 320 so that it forms a gap between the flexure 302 and the contact fixture 304. The resistor bleed circuit board 312 is electrically connected to the bridge 320 and hence the flexure 302 by the discharge wire 330.

Figure 7A:
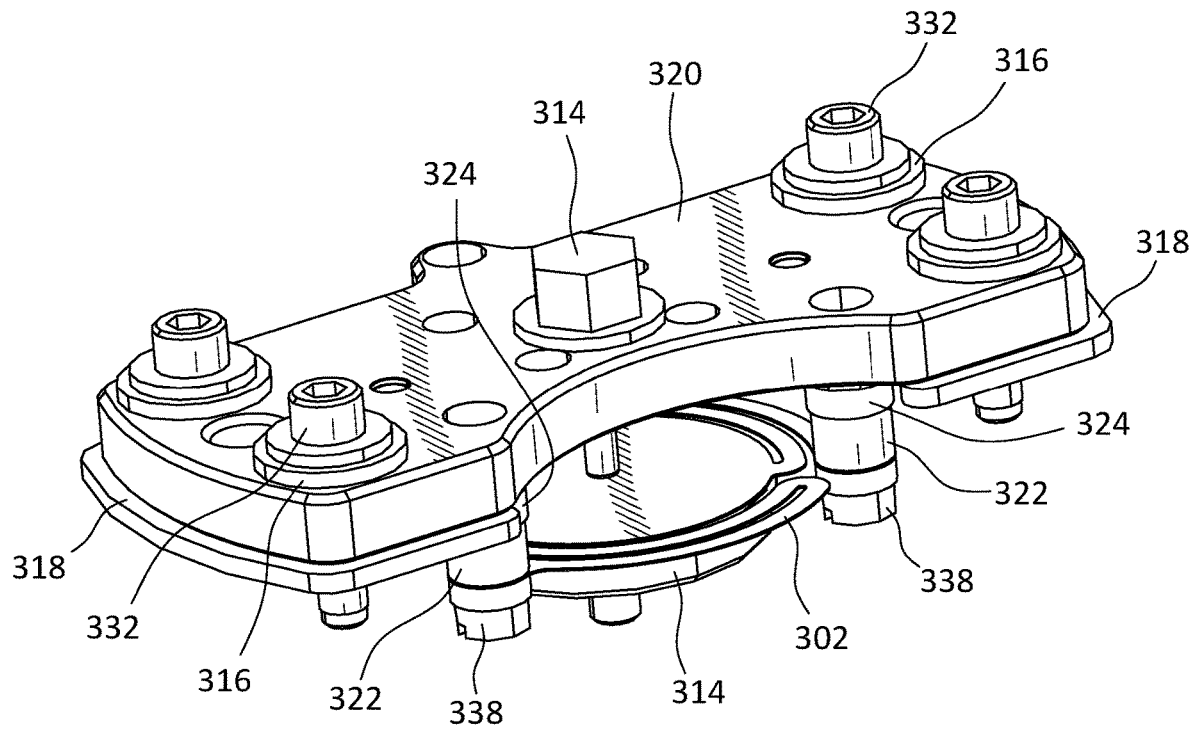
FIGS. 7A and 7B illustrate top perspective and bottom perspective views of the flexure and contact fixture.
Figure 7B:
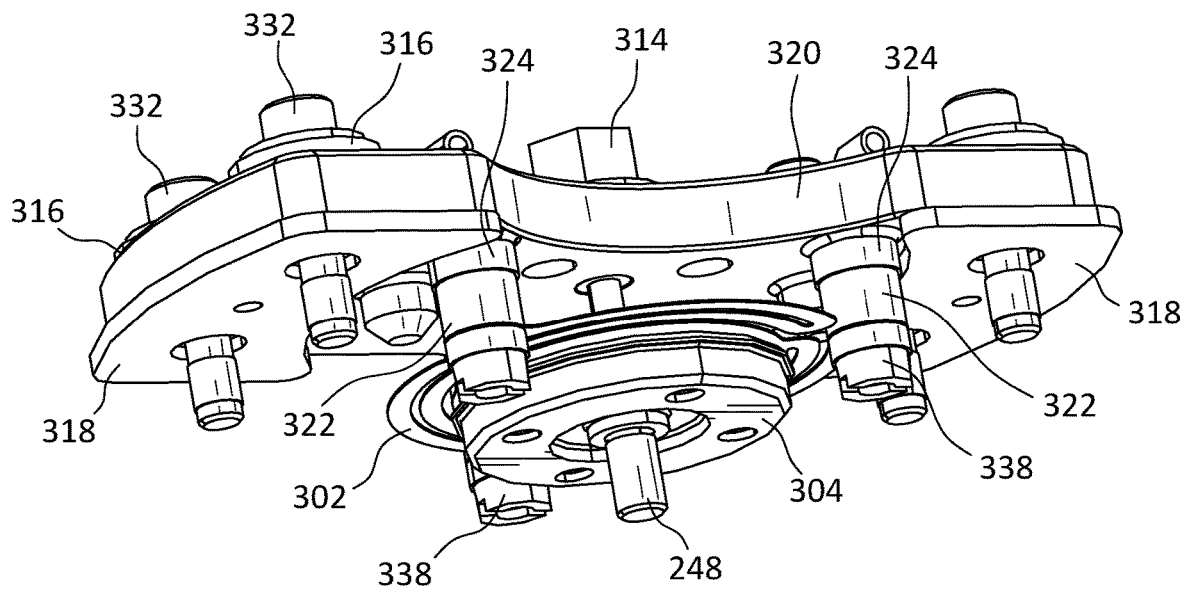
Figure 7C:
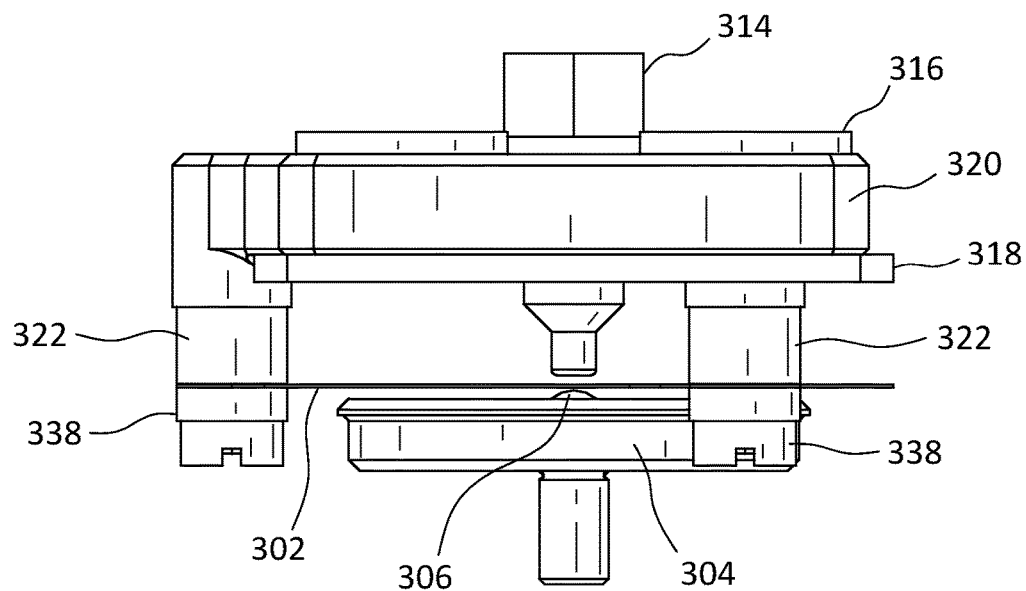
FIG. 7C illustrates a side view of the flexure and the contact fixture.
Figure 7D:
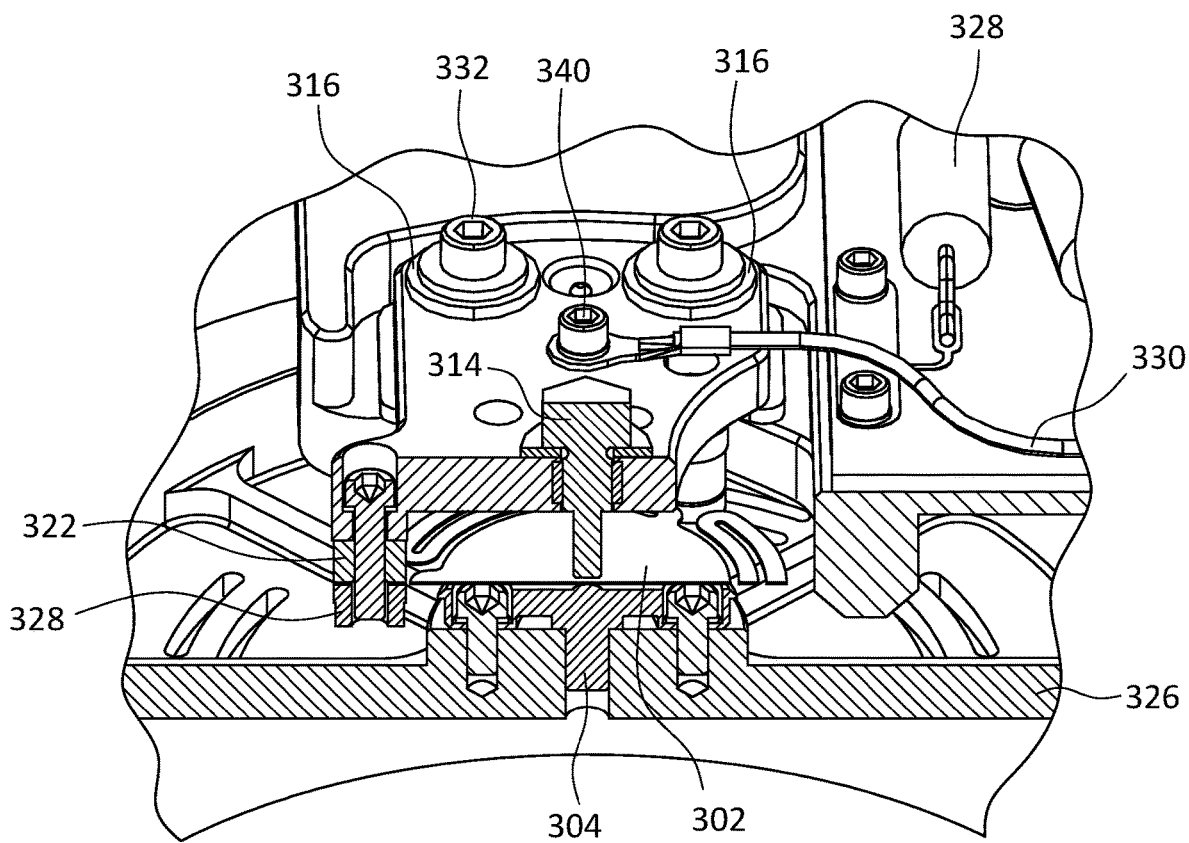
FIG. 7D illustrates a cross-sectional view of the flexure and the contact fixture.
Figure 8A:
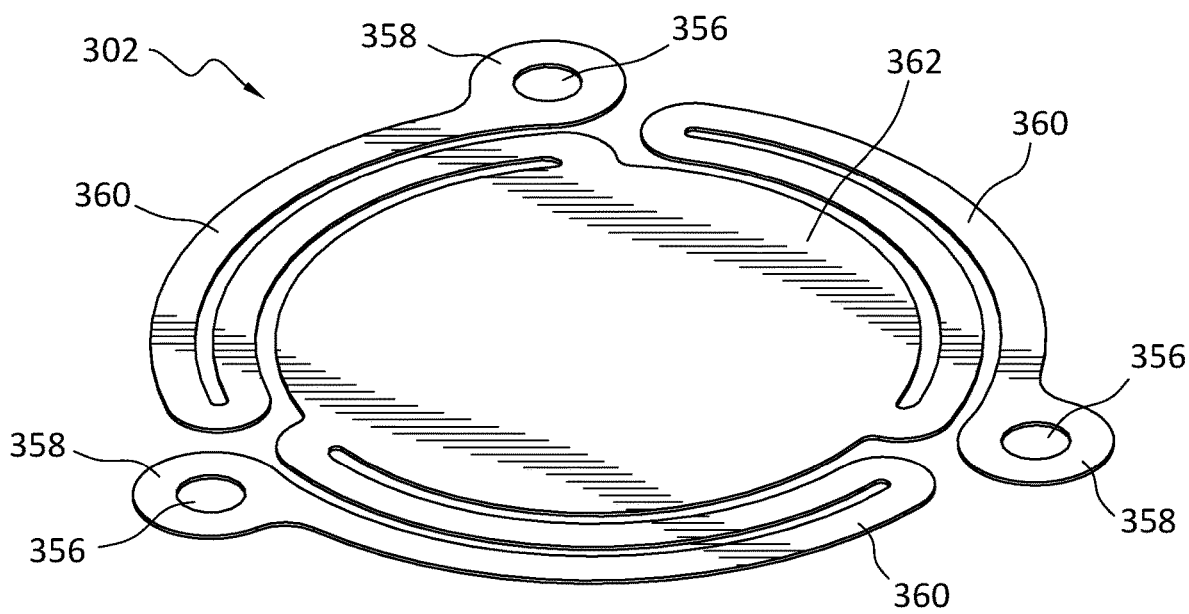
FIGS. 8A and 8B illustrate top perspective and top views of the flexure.
Figure 8B:
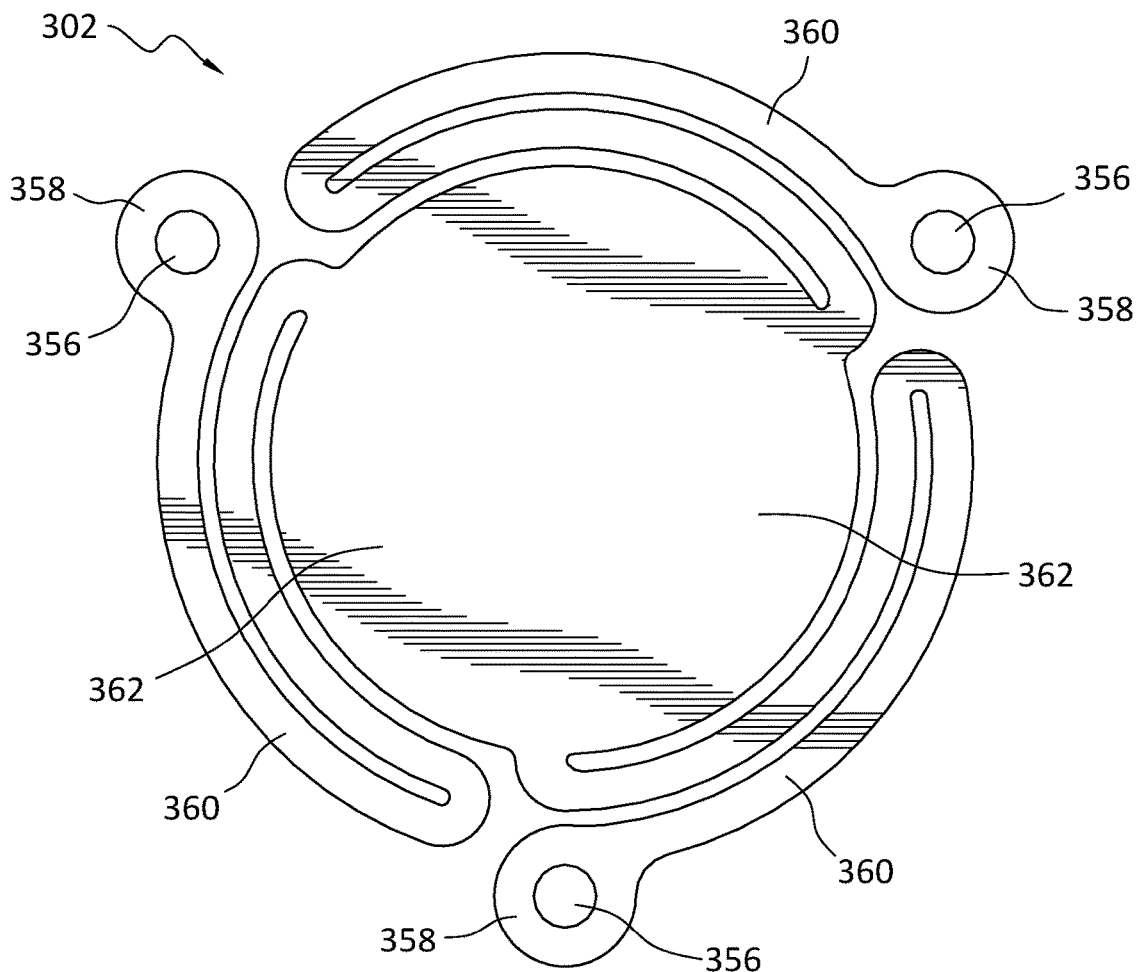

FIGS. 7A and 7B illustrate top perspective and bottom perspective views of the flexure 302 and contact fixture 304. FIG. 7C illustrates a side view of the flexure 302 and the contact fixture 304. FIG. 7D illustrates a cross-sectional view of the flexure 302 and the contact fixture 304. FIGS. 8A and 8B illustrate top perspective and top views of the flexure 302. The flexure 302 has a generally circular structure. The flexure 302 is generally parallel to the contact fixture 304. The flexure 302 is a thin conductive member with a plurality flexure springs 360 attached to and surrounding a flexure body 362. While the flexure 302 is shown has having a generally circular shape, the flexure 302 may take other shapes including for example, an oval, ellipse, triangle, square, any other polygon, etc. In such examples, flexure springs 360 would be placed around the edges of the flexure body 362 and be connected to the flexure body 362.

The flexure spring 360 has a flexure mount 358 and flexure mounting hole 356 at the end of the flexure spring 360. The flexure spring 360 is attached to a flexure bridge mount 324 of the bridge 320 using a shim 322, clamp 338, and a flexure bolt (not shown). The shims 322 may be used to adjust the initial gap between the flexure 302 and the contact fixture 304. Shims 322 with different thicknesses will lead to different initial gaps.

The flexure spring 360 are illustrated as having a U-shaped structure that follows an outer contour of the flexure spring 360. In this example the flexure springs 360 are curved because the flexure body 362 is circular, but the flexure springs 360 could be straight or have other shapes depending upon the shape of the flexure body 362. The structure of the flexure springs 360 can take other forms that allow the flexure body 362 to move relative to the contact fixture 304. The shape, dimensions, and the material of the flexure springs 360 are selected to result in a spring constant that allows for the flexure body 362 to move and to achieve a specified discharge voltage. For example, the flexure springs 360 may be a single member connected to the flexure body 362 and extending along outer edge of the flexure body 362 to the flexure mount 358. In other embodiments a zig-zag structure may be used with three or more legs that generally follow the outer contour of the flexure body 362. The flexure springs 360 may take other shapes as well.

As a charge differential builds up between the rotating part of the motor and the motor cover 308 due to the use of non-conducting motor bearing, the flexure 302 will move towards the contact point 306. Eventually, if the charge differential and voltage become great enough, the charge may discharge either across the reduced gap between the flexure 302 and the contact point 306 or when the flexure 302 comes into contact with the contact point 306.

Other embodiments of the flexure may also be used in the motor gap system. The structure of the flexure will provide the flexibility to allow movement of the flexure to allow for a discharge of any charge accumulated on the flexure and it associated contact fixture that acts as a discharge structure. The shape of the flexure may also be chosen to correspond to the shape of the contact fixture so that a capacitor is created, and then various parameters of the system may be chosen to achieve a specific discharge voltage and other mission parameters.

The self-adjusting gap system described herein may also function as a differential charge measurement or voltage measurement instrument system. By adding a sensor that measures the deflection of the flexure or the size of the gap, the self-adjusting gap system acts as an electric field meter that can then be used to determine a charge difference or voltage difference. In this application, the self-adjusting gap system maintains the advantages of simplicity, low cost, robustness, adjustability, and space compatibility.

Testing of the self-adjusting gap system showed that it exhibited very good performance, longevity, and consistency not seen in other concepts that may be used to address the challenge of charge buildup between isolated elements. The self-adjusting gap system avoids torque impact and the generation of contamination particles that result from the use of a brush type system. The self-adjusting gap system may be controlled better than a fixed gap system that is difficult to adjust precisely. Further, the self-adjusting gap system does not have the problems of a slip ring type or contacting system that can wear fast in particular applications and can induce a torque or other mechanical disturbance or constant drag.

In comparison to the other potential systems to address charge buildup between isolated elements, the self-adjusting gap system disclosed herein has several unique advantages: it may be easily manufactured to be space flight compatible; it does not require external power to operate; it is a non-contacting system that is on standby when not needed; it is robust and exhibits long life due to its intermittent use, minimal contact, and current control; the discharge point allows for locating discharge where it can be shielded and mitigates need for precise part dimensions and alignment settings; the discharge voltage may be set or maintained at the appropriate level with greater precision then other systems; the self-adjusting gap system controls the current and extends the time to keep instantaneous energy below required threshold; and it can easily be modified to measure the potential.

The self-adjusting gap system may be used in at least the following applications: low orbit satellites; deep space spacecraft mechanisms; devices or environments where contamination is a concern (such as medical field or equipment in clean room environments); applications where torque or other mechanical disturbances are a concern such as scanners; as a simple low cost sensor for getting data on space charging environments (more data needed by community); and applications where very long life is desired or it is a backup that can operate without external power.

While each of the embodiments are described above in terms of their structural arrangements, it should be appreciated that the invention also covers the associated methods of using the embodiments described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications and combinations of the various embodiments can be affected while remaining within the spirit and scope of the invention. Accordingly, the foregoing disclosure, description, and figures are for illustrative purposes only and do not in any way limit the invention, which is defined only by the claims.

What is claimed is:

1. A self-adjusting gap system, comprising:
a flexure connected to a first electrically isolated element, wherein the flexure allows motion or has a flexible element, and has an electrically conductive element;
a contact fixture connected to a second electrically isolated element, wherein the second electrically isolated element is electrically isolated from the first electrically isolated element; and
a contact point on one of the contact fixture and the flexure configured to be a discharge location for a discharge of a differential charge between the first electrically isolated element and the second electrically isolated element;
wherein the flexure is configured to flex or move due to the differential charge to reduce an initial first gap between the flexure and the contact fixture.

2. The self-adjusting gap system of claim 1, further comprising a bleed circuit electrically connected between the flexure and the first electrically isolated element, wherein the bleed circuit includes an electrical element configured to control a discharge current between the flexure and the contact point.

3. The self-adjusting gap system of claim 1, further comprising a mounting bracket, wherein a first end of the flexure is connected to the mounting bracket.

4. The self-adjusting gap system of claim 3, further comprising a shim, wherein the shim is between the mounting bracket and the flexure and the shim is configured to control the first initial gap.

5. The self-adjusting gap system of claim 4, further comprising a bridge, wherein the mounting bracket is connected to the bridge.

6. The self-adjusting gap system of claim 5, further comprising a hard stop connected to the bridge, wherein an end of the hard stop forms a second gap with the flexure and the end of the hard stop limits a distance that the flexure can move towards the hard stop.

7. The self-adjusting gap system of claim 5, further comprising an electrically isolating member mechanically between the bridge and the first electrically isolated element.

8. The self-adjusting gap system of claim 1, where the second electrically isolated element rotates relative to the first electrically isolated element.

9. The self-adjusting gap system of claim 1, further comprising a bridge, wherein the flexure is connected to the bridge.

10. The self-adjusting gap system of claim 9, further comprising a shim, wherein the shim is between the bridge and the flexure and the shim is configured to control the first initial gap.

11. The self-adjusting gap system of claim 9, further comprising a hard stop connected to the bridge, wherein an end of the hard stop forms a second gap with the flexure and the end of the hard stop limits a distance that the flexure can move towards the hard stop.

12. The self-adjusting gap system of claim 9, further comprising an isolating member mechanically between the bridge and the first electrically isolated element.

13. The self-adjusting gap system of claim 9, where the flexure includes a flexure body and a plurality of flexure springs connected to the flexure body, wherein the flexure springs connect to the bridge.

14. The self-adjusting gap system of claim 13, wherein the flexure springs have a U-shaped structure.

15. The self-adjusting gap system of claim 13, wherein the flexure springs have a zig-zag shaped structure.

16. The self-adjusting gap system of claim 13, wherein the flexure body is round and the flexure springs have curved shape.

17. The self-adjusting gap system of claim 1, further comprising a sensor configured to measure a strain on the flexure, deflection of flexure, shape of flexure, or gap size between the flexure and contact fixture to determine a voltage between the flexure and the contact fixture.

* * * * *